United States Patent [19]

Ng

[11] Patent Number: 5,914,744
[45] Date of Patent: Jun. 22, 1999

[54] APPARATUS AND METHOD OF PRINTING WITH NON-UNIFORMITY CORRECTION OF EXPOSURE PARAMETERS TO REDUCE LOW SPATIAL FREQUENCY PRINTED ARTIFACTS

[75] Inventor: Yee Seung Ng, Fairport, N.Y.

[73] Assignee: Eastman Kodak Company, Rochester, N.Y.

[21] Appl. No.: 08/837,064

[22] Filed: Apr. 11, 1997

[51] Int. Cl.⁶ ............................. B41J 2/435; B41J 2/45
[52] U.S. Cl. .................. 347/237; 347/238; 347/240; 347/247; 358/298; 395/115
[58] Field of Search .................... 347/125, 238, 347/240, 251, 237, 247; 358/298; 395/115

[56] References Cited

U.S. PATENT DOCUMENTS

| | | | |
|---|---|---|---|
| 4,455,562 | 6/1984 | Dolan et al. | 347/130 |
| 5,586,055 | 12/1996 | Ng et al. | 702/90 |
| 5,640,190 | 6/1997 | Bollansee et al. | 347/240 |
| 5,818,501 | 10/1998 | Ng et al. | 347/240 |

OTHER PUBLICATIONS

Yee S. Ng, "Visual Tolerance Study with One–Dimensional Periodic (Sinusoidal) and Non–Periodic (Impulse) Noise in Electrophotgraphic Gray Level Halftones", Proceedings of IS&T's Eleventh International Congress on Advances in Non–Impact Printing Technologies, 1995, pp. 493–496.

Yee S. Ng, Hieu T. Pham, Hwai T. Tai and Eric K. Zeise, "Gray level printing method with embedded non–uniformity correction using a multibit LED printhead", IS&T's 47th Annual Conference Proceedings, 1994, pp. 622–625.

Yee S. Ng, Heiu Pham and Robert C. Laird, "Non–uniformity correction in LED printing with plural resolution recording", SPIE Proc., vol. 1254, Optical HardCopy and Printing Systems, 1990, pp. 166–177.

Yee S. Ng, "Visual Tolerance Study of One–Dimensional Periodic (sinusoidal) Noise in Various Spatial Frequency Binary and Graylevel Halftones", Proceedings of IS&T's 12th International Conference on Digital Printing Technologies, 1996. pp. 69–71.

*Primary Examiner*—N. Le
*Assistant Examiner*—Hai C. Pham
*Attorney, Agent, or Firm*—Norman Rushefsky

[57] ABSTRACT

A non-impact printer apparatus and method employs a printhead including a plurality of recording elements and drivers for driving respective recording elements in response to data relative to respective corrected exposure times for recording respective pixels. A first data storage device stores data relative to associating sets of respective recording elements with respective bins. The first data storage device is responsive to first input signals identifying respective recording elements and outputs second signals relative to respective bin assignment numbers for the respective recording elements. A second data storage device is responsive to the second signals for outputting data relative to corrected exposure times for recording respective pixels by respective recording elements. The bin assignment determination for recording elements are established by propagating exposure error calculated from an adjacent respective recording element. This is done so that low resolution spatial frequency errors in cross-track recording noticeable by the eye are generally substantially lower than high resolution spatial frequency errors to reduce visible artifacts in recording.

5 Claims, 11 Drawing Sheets

APPARATUS AND METHOD OF PRINTING WITH NON-UNIFORMITY CORRECTION OF EXPOSURE PARAMETERS TO REDUCE LOW SPATIAL FREQUENCY PRINTED ARTIFACTS

BACKGROUND OF THE INVENTION

1. Field of the Invention

This invention relates to non-impact printing and more particularly to a method and apparatus for non-impact printing using printheads with plural recording elements wherein correction is required to provide uniformity in recording by the recording elements.

2. Description of the Prior Art

In the prior art of non-impact printing such as with use of LED printheads, examples of which may be found in U.S. Pat. Nos. 5,255,013 and 5,253,934, it is known that correction of the recording elements; i.e., LEDs, is often required due to non-uniformity in light output of these elements. Typically, a non-uniformity correction look-up table (LUT) is provided to adjust exposure times so that at any one required grey level all the light-emitting diodes (LEDs) can be enabled to output a uniform amount of exposure energy. This can be achieved by adjusting exposure times and/or intensities so that weaker emitters are enabled, say, for longer exposure times than stronger emitters so that the exposure energy from each emitter is uniform.

Typically, correction data is determined through factory measurement of the brightness of the individual recording elements while the printhead is off of the copier/printer apparatus. The correction data may then be calculated and loaded into the copier/printer apparatus. When the printhead is then mounted onto the copier/printer, correction tables associated with the copier/printer may be used to correct the image data.

For each level of gray the number of exposure times that can be requested is potentially equal to the number of LEDs in the printhead. Thus, for a j-bit gray level system that uses an LED printhead with N LEDs as the writer, the number of possible exposures that can be requested is N ($2^j$–1), excluding the null exposure level (white). For N=4000 (typical) and j=4, this number is quite large. There is no economical printhead architecture that is capable of generating nearly as many exposures as this. The number of exposures that a typical LED printhead can generate is determined by its controller circuit. For a printhead with a k-bit (say 6-bits) controller, the total number of exposures that can be generated is $2^k$, with j≦k but significantly less than N ($2^j$–1). It is the goal of a non-uniformity correction algorithm such as that disclosed in U.S. application Ser. Nos. 08/175,079 and now U.S. Pat. No. 5,666,150 and 08/580,263 and now U.S. Pat. No. 5,818,501, the contents of which are incorporated herein by reference, to use the total number of exposures that can be requested to generate an optimum look-up table (LUT) with $2^k$ entries. The procedure for generating the LUT must condense in some optimal manner all the exposures that can be requested (including zero) into $2^k$ exposures.

I have used a frequency analysis technique to identify the spatial exposure non-uniformity noise of a printer system before and after non-uniformity correction. Because known non-uniformity correction methods are used to correct on a pixel-by-pixel basis for binary and multilevel printheads, a typical exposure error (in %) curve vs. spatial frequency would show a curve that has fluctuation in residue error more or less uniformly distributed in frequency space as shown in FIG. 9. FIG. 9 is a plot of the exposure error (in %) for gradation level 12 using a k=6 bits LED printhead (600 dpi) after the known non-uniformity correction method of U.S. application Ser. No. 08/175,079 has been applied with a dual LUT (a 256 levels bin LUT for the LED pixel brightness and a 6-bits output correction LUT that uses the bin output as input to select the proper 6-bits exposure time output) approach described in U.S. application Ser. No. 08/580,263

It is known that human observers have a higher tolerance to non-uniformity noise at higher spatial frequency than lower spatial frequency both for continuous tone, binary halftones and multilevel halftones. To further improve on the non-uniformity correction of multiple pixel printing system such as an LED printhead (or inkjet or thermal printhead), it would be desirable to be able to push the spatial frequency of the residue non-uniformity exposure error to a spatial frequency less objectionable to a human observer.

If non-uniformity correction is handled solely on a pixel-by-pixel basis, the residue non-uniformity in exposure is not correlated to neighborhood pixels. Thus, if a block of pixels start out with a similar brightness but each individual pixel can only be correlated to ~+/−2.5% for a particular gradation level (for example one out of the 16 gradation levels available for a k=6 bits printhead), then one can obtain a corrected printhead wherein a block of LEDs will all be giving 2% more exposure than the average and another neighborhood block of LEDs may all be corrected to 2% less exposure than average. Defects like this are very visible to a human observer. As will be appreciated from the above, while each individual LED has been provided with excellent correction, there still may arise visual printing artifacts that detract from the print and may ironically result from the correction process.

It would, therefore, be desirable to provide for a method and apparatus that overcomes these problems.

SUMMARY OF THE INVENTION

In accordance with a first aspect of the invention, there is provided a method of printing comprising providing a non-impact recording head having a plurality of recording elements extending as a row in a cross-track direction relative to a recording medium, recording on a recording medium using the recording elements and adjusting recording parameters for the recording elements so that low resolution spatial frequency errors in cross-track recording noticeable by the eye are generally substantially lower than high resolution spatial frequency errors to reduce visible artifacts in recording.

In accordance with a second aspect of the invention, there is provided a non-impact printer apparatus comprising a printhead including a plurality of recording elements and drivers for driving recording elements in response to first data signals for recording pixels, the recording elements being adapted to record in a cross-track direction of a moving recording medium; a storage device storing said first data signals, said first data signals representing non-uniformity corrected recording control parameters for recording pixels so that relatively higher spatial frequency recording errors for recording pixels in the cross-track direction by the recording elements are generally substantially higher in magnitude than relatively lower spatial frequency recording errors in the cross-track direction; and a signal generator generating a second signal identifying a recording element at an input to the storage device, the storage device being responsive to the second signal for outputting a first data signal for recording by a respective recording element.

In accordance with still another aspect of the invention, there is provided a non-impact printer apparatus comprising a printhead including a plurality of recording elements and drivers for driving respective recording elements in response to data relative to respective corrected exposure times for recording respective pixels; a first data storage device storing data relative to associating sets of respective recording elements with respective bins; a signal generator for generating respective first signals identifying respective recording elements; the first data storage device being responsive to the first signals and adapted to output second signals relative to respective bin assignment numbers for respective recording elements; a second data storage device responsive to the second signals for outputting data relative to corrected exposure times for recording respective pixels by respective recording elements; and the first data storage device including data relative to bin assignments of recording elements wherein bin assignment determination for a recording element is established by propagating exposure error calculated from an adjacent recording element.

These and other additional aspects of the invention as disclosed herein will become more apparent when considering the specification taken in conjunction with the accompanying drawings wherein:

BRIEF DESCRIPTION OF THE DRAWINGS

FIG. 8 and 8A and 8B illustrate a flowchart for generating correction data for correcting nonuniformities in emission of recording elements on the printhead of FIG. 6 in accordance with the invention;

DESCRIPTION OF THE PREFERRED EMBODIMENT

Because apparatus of the general type described herein are well known the present description will be directed in particular to elements forming part of, or cooperating more directly with, the present invention.

Figure 1:
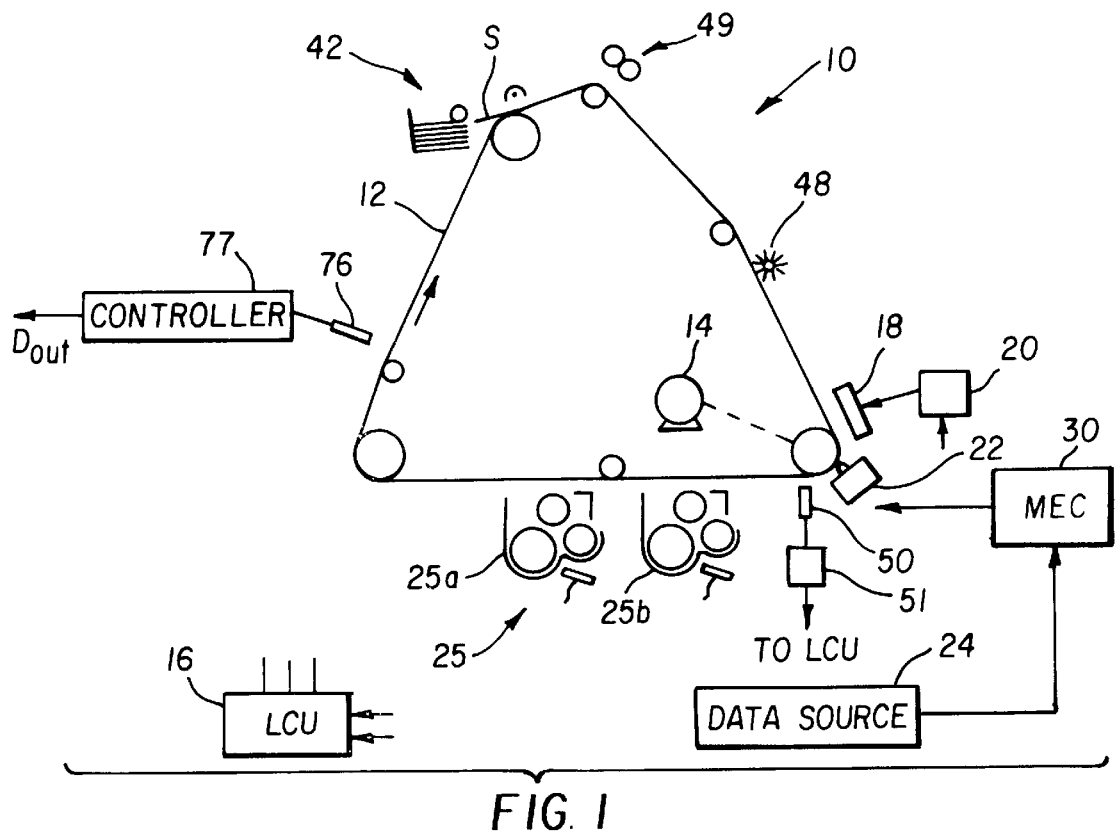
FIG. 1 is a diagram of an electrophotographic recording apparatus of the invention.

With reference to the copier/printer apparatus 10 as shown in FIG. 1, a moving image recording member such as photoconductive belt 12 is driven by a motor 14 past a series of work stations of the printer. A logic and control unit (LCU) 16, which has a digital computer, has a stored program for sequentially actuating the work stations.

Briefly, a charging station 18 sensitizes belt 12 by applying a uniform electrostatic charge of predetermined primary voltage $V_0$ to the surface of the belt. The output of the charger is regulated by a programmable controller 20, which is in turn controlled by LCU 16 to adjust primary voltage $V_0$ for example through control of electrical potential ($V_{grid}$) to a grid that controls movement of charges from charging wires to the surface of the recording member as is well known.

At an exposure station, projected light from a non-impact write head 22 dissipates the electrostatic charge on the photoconductive belt to form a latent image of a document to be copied or printed. The write head or printhead has an array of recording elements preferably light-emitting diodes (LEDs) or other light or radiation-emitting sources for exposing the photoconductive belt picture element (pixel) by picture element with an intensity regulated by current drivers on the printhead and as will be described in more detail below.

Image data for recording is provided by a data source 24 for generating electrical image data signals such as a computer, a document scanner, a memory, a data network, facsimile, word processor, data reader, etc. Signals from the data source and control signals from the LCU are provided to a marking engine controller (MEC) 30. The marking engine controller responds to these signals to generate signals for output to the printhead for controlling selective enablement of the LEDs. Light from the LEDs may be focused by a suitable lens for imaging upon the electrostatically charged belt 12. The plurality of LEDs are arranged in a row that is generally perpendicular to or in a cross-track direction relative to the direction of movement of the belt 12. The printhead in addition to recording image information is also adapted to record process control patches that are recorded usually in an interframe between recorded images for testing to determine a need to adjust process control parameters. In order to form patches with density, the LCU or MEC 30 may be provided with ROM or other memory representing data for creation of a patch. Travel of belt 12 brings the areas bearing the electrostatic latent images into a development area 25. The development area may have one or more magnetic brush development stations 25a, 25b. Each station has a magnetic brush in juxtaposition to, but spaced from, the travel path of the belt. Magnetic brush development stations are well known. For example, see U.S. Pat. Nos. 4,473,029 to Fritz et al and 4,546,060 to Miskinis et al. The two stations 25a, 25b are provided to selectively provide respective different color toners for development of recorded images on the belt 12.

LCU 16 selectively activates the appropriate development station in relation to the passage of the image areas containing latent images to selectively bring the magnetic brush into engagement with or a small spacing from the belt. The charged toner particles of the engaged magnetic brush are attracted imagewise to the latent image pattern to develop the pattern.

As is well understood in the art, conductive portions of the development station, such as conductive applicator cylinders, act as electrodes. The electrodes are connected to a variable supply of D.C. potential $V_B$ regulated by a programmable controller (not shown). Details regarding the development station are provided as an example, but are not essential to the invention.

A transfer station 42 as is also well known is provided for moving a receiver sheet S into engagement with the photoconductor in register with the image for transferring the image to a receiver. Alternatively, an intermediate member may have the image transferred to it and the image may then be transferred to the receiver. A cleaning station 48 is also provided subsequent to the transfer station for removing toner from the belt 12 to allow reuse of the surface for forming additional images. In lieu of a belt, a drum photoconductor or other structure for supporting an image may be used. After transfer of the unfixed toner images to a receiver sheet, such sheet is transported to a fuser station 49 where the image is fixed.

The LCU provides overall control of the apparatus and its various subsystems as is well known. Programming commercially available microprocessors is a conventional skill well understood in the art. The following disclosure is written to enable a programmer having ordinary skill in the art to produce an appropriate control program for such a microprocessor. In lieu of only microprocessors the logic operations described herein may be provided by or in combination with dedicated or programmable logic devices.

Process control strategies generally utilize various sensors to provide real-time control of the electrostatographic process and to provide "constant" image quality output from the user's perspective.

One such sensor may be a densitometer 76 to monitor development of test patches in non-image areas of photoconductive belt 12, as is well known in the art. The densitometer is intended to insure that the transmittance or reflectance of a toned patch on the belt is maintained. The densitometer may consist of an infrared LED which shines through the belt or is reflected by the belt onto a photodiode. The photodiode generates a voltage proportional to the amount of light received. This voltage is compared by controller 77 to the voltage generated due to transmittance or reflectance of a bare patch, to give a signal representative of an estimate of toned density. This signal $D_{out}$ furnished to the LCU is transmitted to the LCU and may be used by the LCU in accordance with a program stored therein to adjust $V_0$, $E_0$, or $V_B$. In addition to measuring density an electrometer 50 may be provided to measure the charge remaining after exposure but prior to development of the patch. The measured charge signal is also provided to the LCU for use in adjustment of the various process control parameters.

The density signal $D_{out}$ may be used to detect short term changes in density of a measured patch to control primary voltage $V_0$, $E_0$ and/or $V_B$. To do this, $D_{out}$ is compared with a set point density value or signal D (SP) and differences between $D_{out}$ and D(SP) cause the LCU to change settings of $V_{grid}$ on charging station 18 or adjust exposure through modifying exposure duration or light intensity for recording a pixel and/or adjustment to the potentials $V_B$ at the two development stations. These changes are in accordance with values stored in the LCU memory, for example, as a look-up table.

Figure 2:
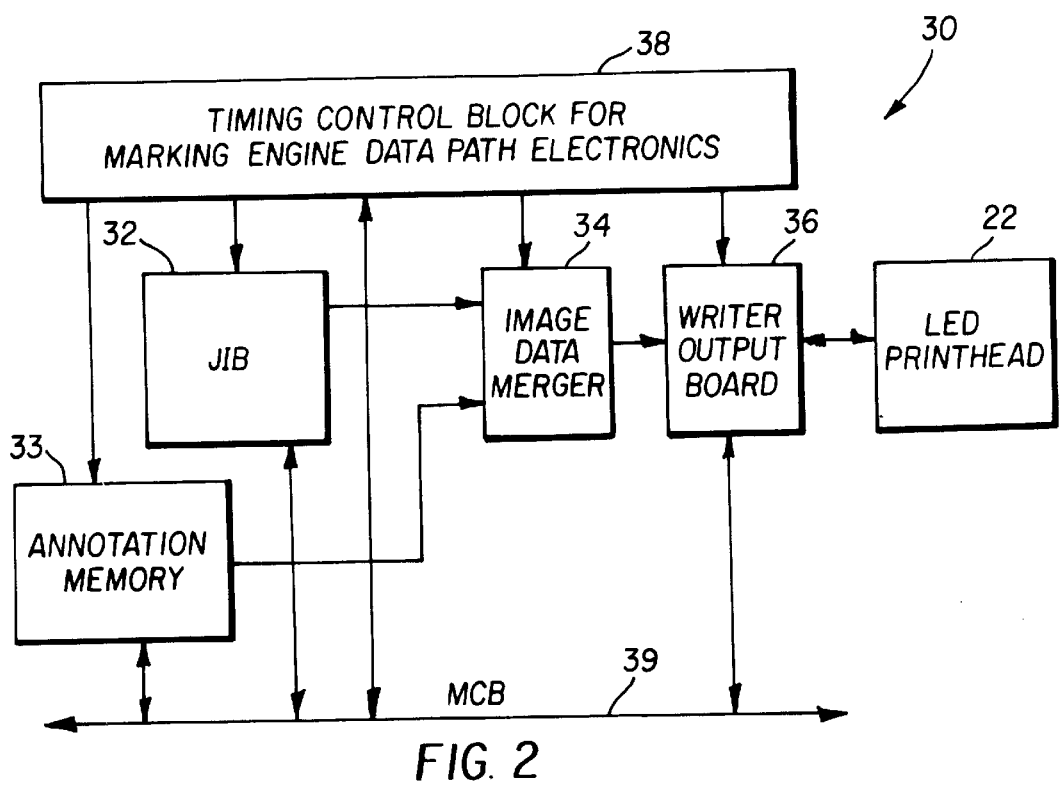
FIG. 2 is a block diagram of an image data path in a portion of the apparatus of FIG. 1.
Figure 6:
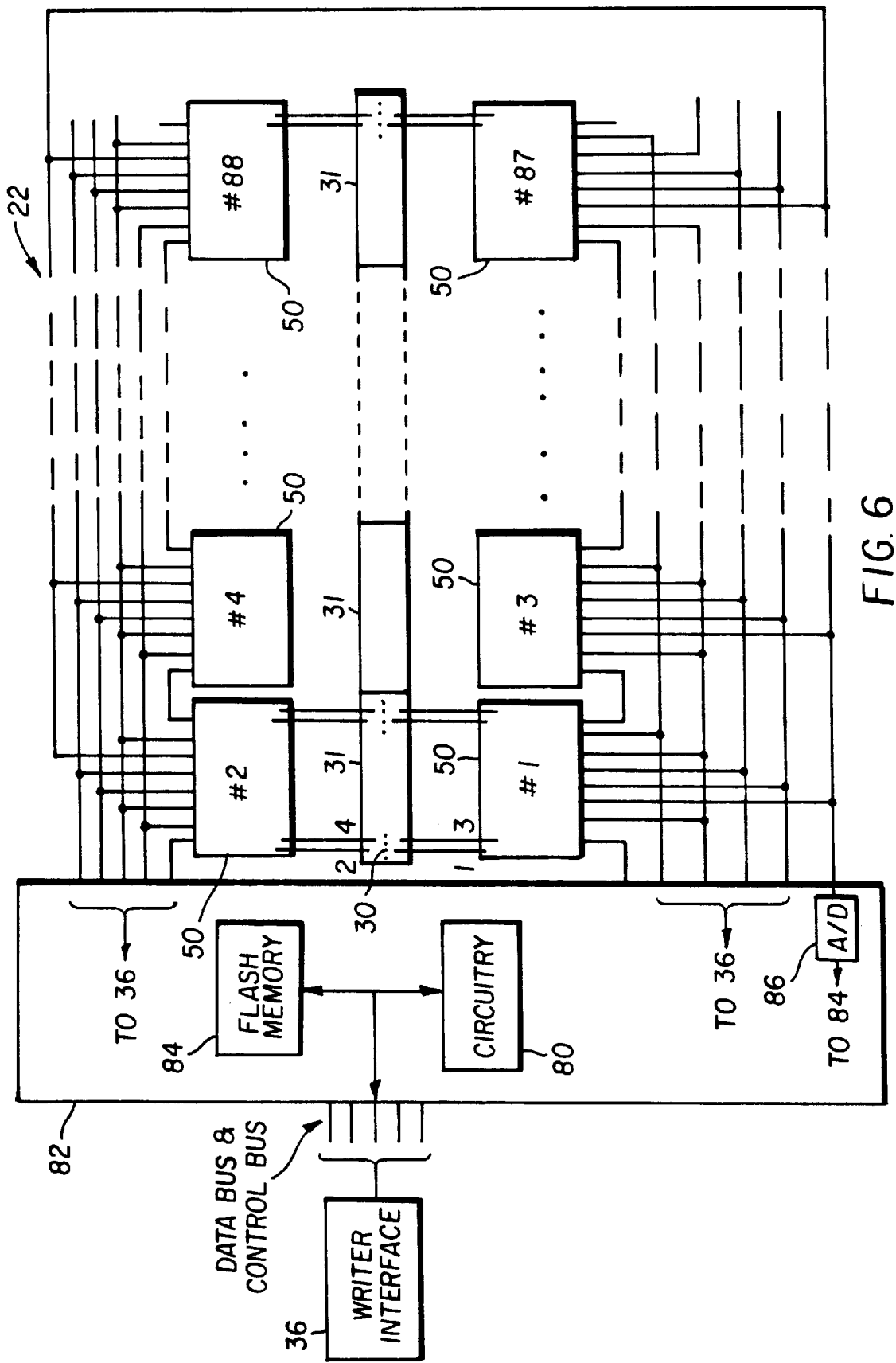
FIG. 6 is a block diagram of a printhead that receives corrected image data signals in accordance with the invention.

With reference now to FIG. 2, a block diagram schematic of a marking engine controller's data path in accordance with the invention is provided. The marking engine controller 30 includes a job image buffer (JIB) 32 into which rasterized data received from data source 24 is stored for example in compressed form. Data from data source 24 is compressed, stored in a multipage image buffer and expanded for output from the JIB. Several pages of data for each job can be stored to allow for reproducing multiple copy sets. An example of a job image buffer is described in U.S. Pat. No. 5,384,646. When a production job is stored in the JIB is to be printed, the image data is output to an image data merger device 34 wherein the data in the JIB can be merged with annotation data such as logos, time and date stamps, addresses, etc., stored in a nonvolatile annotation data memory 33. The merger may be logic devices and buffers or other known devices for performing this function or the merger device may be deleted. The image data whether merged with additional data to be printed or not merged is then output to a writer-interface (WIF) output board 36 that is in accordance with the invention. The WIF 36 modifies the image data before sending to the printhead 22 so that the data, for each pixel to be recorded by an LED on the printhead is adjusted to also control uniformity of that LED. An example of a grey level LED printhead that may be provided with corrected image data signals is disclosed in U.S. Pat. No. 5,253,934, the contents of which are incorporated herein by reference. As noted in this patent and with reference to FIGS. 6 and 7, corrected image data and control signals, such as clock signals, token signals, latch signals, power, etc. are sent to the printhead from the writer-interface 36 over a data bus and control bus. The data and control signals are input into driver chips 50 which are located on each side of a line of LED chip arrays 31. Each LED chip array includes for example 128 LEDs arranged in a line. The chip arrays are butted together to provide a single row of several thousand LEDs. The driver chips 50 receive the data and control signals and are used to generate current for driving the LEDs to which the driver chips are electrically connected. Within each driver chip, the corrected image data is latched in respective image data latch or storage registers 51 and an exposure period for recording a pixel is commenced and the duration of currents to respective LEDs determined by comparison by a comparator 52 of corrected image data signals with an output of a counter 53 that is counting exposure clock pulses. Control of current in each of plural driver channels is provided to respective LEDs on the printhead by a constant current driver that forms a part of a current mirror having a master circuit 55 that generates a controlled amount of current in response to digital current control data that is also sent to the printhead. In response to this current control data certain current-conducting transistors are enabled in the master circuit to cause a net current to flow in the master circuit and this net current is related to the current control data denoted in U.S. Pat. No. 5,253,934 as VREF and RREF. In the aforementioned patent, the term "VREF" refers to a current control data of 8-bits size that is provided identically to all the driver chips that are on the printhead while the term "RREF" refers to current control data of 8-bits size that may differ from driver chip to driver chip on the same printhead. As noted in the aforementioned patents, a row of say 128 LEDs may be formed on each chip array and a series of these arrays are assembled on a suitable support to provide a printhead with a single row of LEDs that are of several thousand LEDs. Each LED chip array may have one or preferably two driver chips associated therewith and mounted adjacent thereto for providing current to LEDs selected for energization to record a pixel. In response to selection or enablement of an LED a current is generated in a current-generating channel of the driver chip and this current energizes the respective LED to emit light for a period of time related to the corrected image data signal. The current to the LED mirrors, i.e., is proportional to or related to that in the driver chip master circuit. Thus, effective control of the LED is provided with say k=6-bits per pixel of image data to define a recording duration and 16-bits of current control data used to control current thereto. As the term VREF describes current control data that is applied to all the driver chips, it will hereinafter be referred to as GREF current control data to more precisely describe its characteristic as a "global reference" voltage generating data, whereas RREF will be referred to as LREF in view of its being "local reference" voltage generating data; i.e. it may vary from driver chip to driver chip on the printhead.

The WIF board 36 thus provides to the printhead 22 in addition to corrected image data signals, control and timing signals such as current control data GREF and LREF, signals for latching data in respective image data storage registers 51, clock signals including that for timing exposure (EXPCLK). In addition, there are provided power and ground signals. The various control timing signals are provided by timing control board 38 that forms part of the control system for controlling the marking engine.

Figure 3:
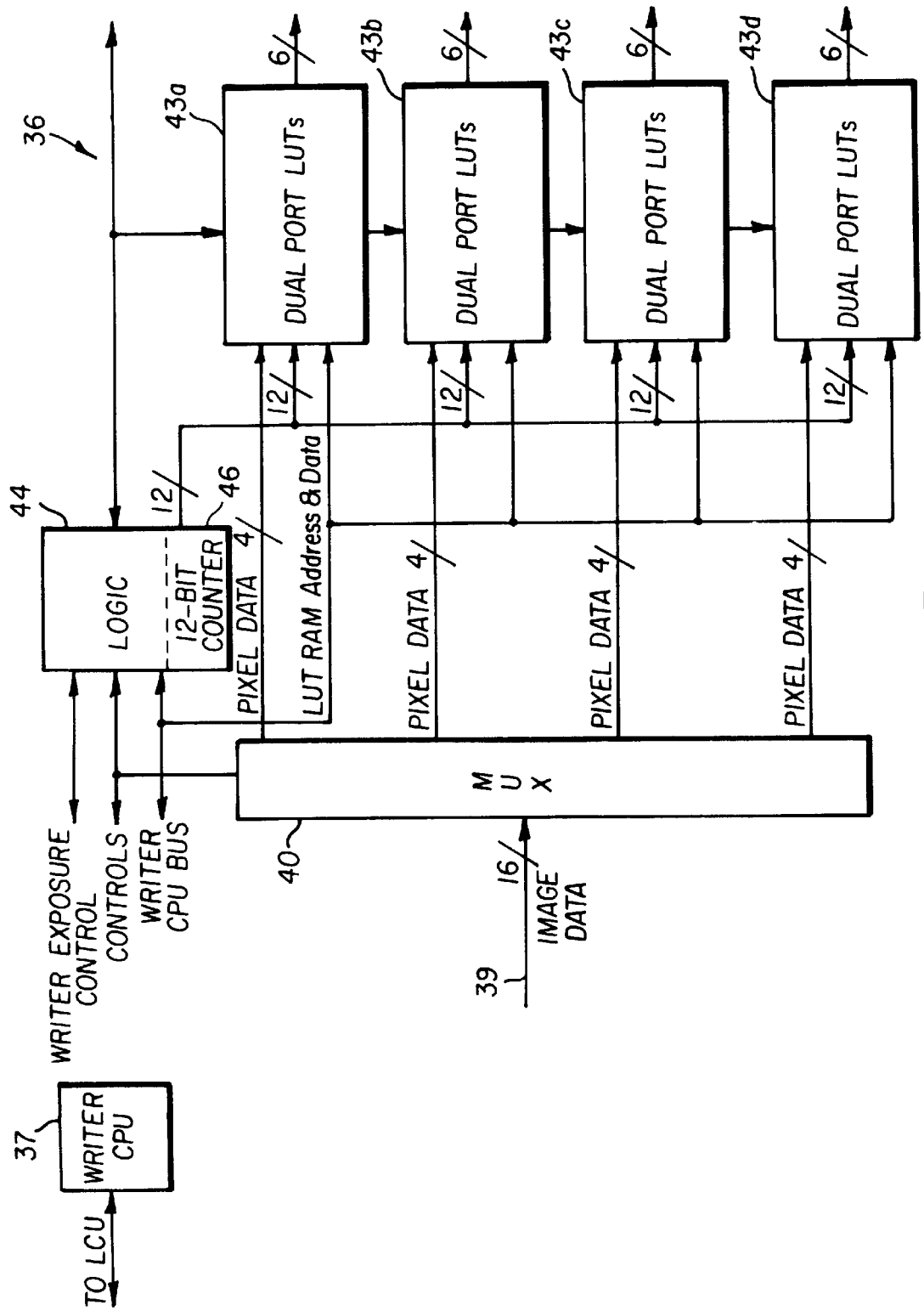
FIG. 3 is a more detailed block diagram of a portion of a writer output board shown in FIG. 2.

With reference to FIG. 3, the WIF board 36 includes a multiplexer (MUX) 40 which simultaneously receives from the merger device 34 grey level image data of up to say 4-bits per pixel bit depth for say each of four pixels. Thus, for example, grey level image data for low even-numbered LEDs, low odd-numbered LEDs, high even-numbered LEDs, and high odd-numbered LEDs are provided on bus 39 at the input of MUX 40. The image data for four pixels may be simultaneously input into the multiplexer 40 for distribution under control of control signals from a writer CPU 37 to four respective similar in construction dual port RAM look-up table (LUT) assemblages 43a, 43b, 43c and 43d. These LUT assemblages provide uniformity correction to the grey level image data being output to the printhead from the JIB 32 or image data merger logic device 34.

Figure 4:
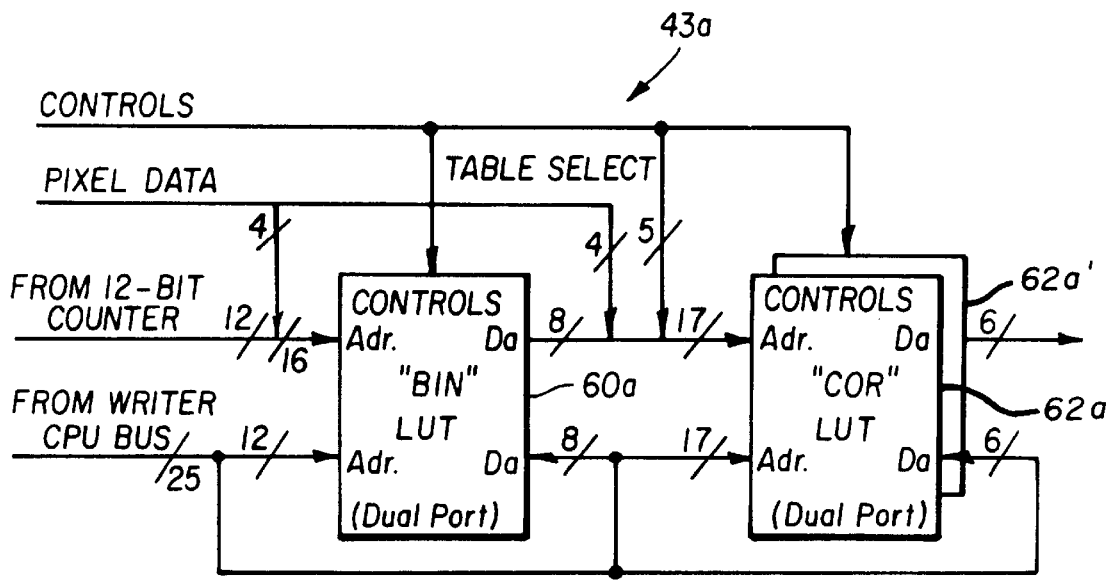
FIG. 4 is a still more detailed block diagram of a pair of dual port look-up table assemblage used in accordance with the method and apparatus of the invention.

With reference now to FIG. 4, there is shown an example of one of the dual port LUT assemblages 43a. A first part of LUT assemblage 43a includes a BIN LUT 60a wherein the low odd-numbered LEDs are categorized into 256 bins or tables wherein LEDs having similar brightness characteristics are associated in the same bin or table. A prior art process for categorizing the LEDs into bins is described in U.S. application Ser. No. 08/175,079, filed in the name of Ajewole, and in U.S. application Ser. No. 08/580,263.

Figure 7:
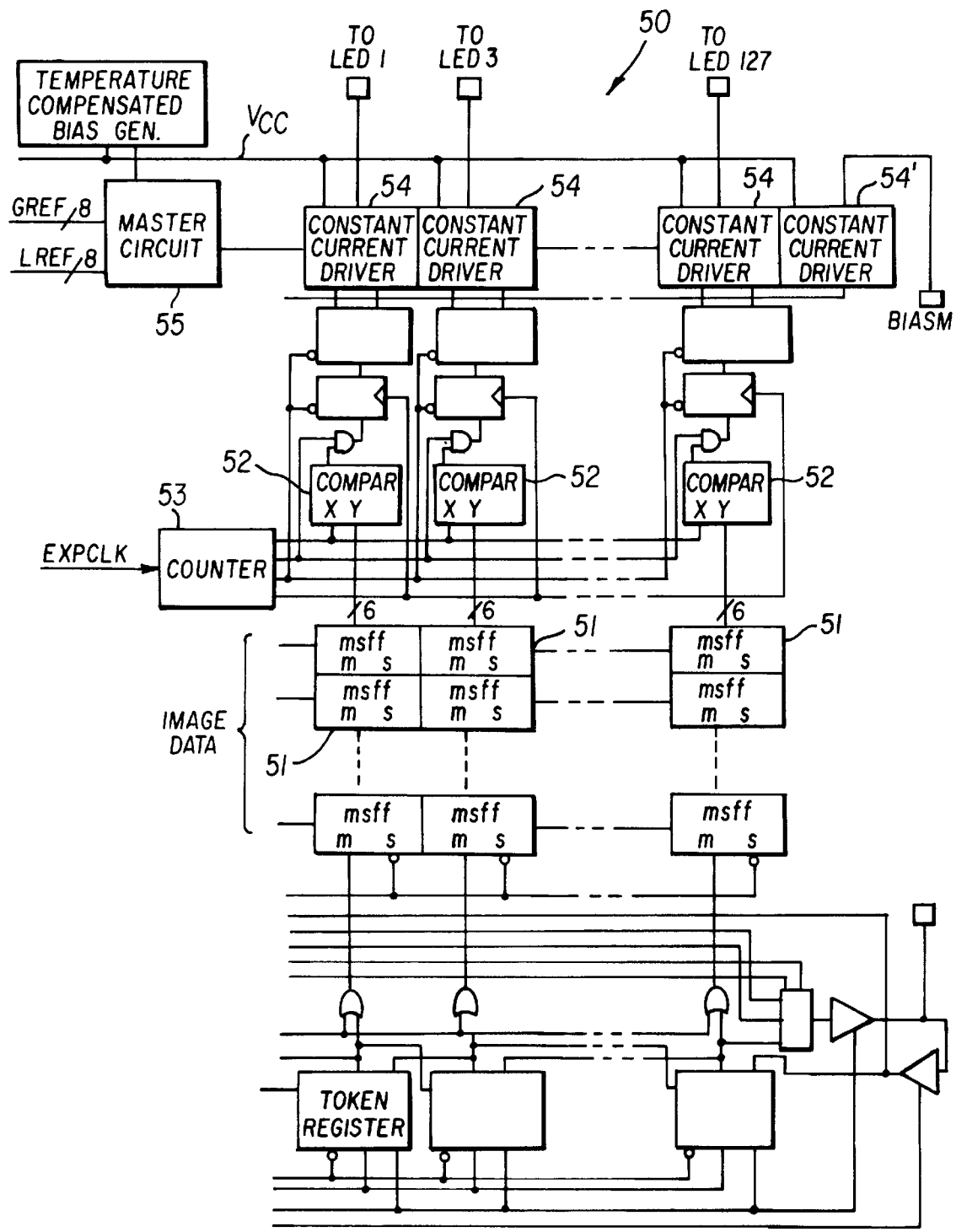
FIG. 7 illustrates three of 64 current driver channels that form a part of a driver chip that is included on the printhead of FIG. 6.

The BIN LUT is a dual port RAM that contains the 256 tables into which one quarter of the LEDs on the printhead are categorized. One port of the BIN LUT is used for loading the data representing the tables by a computer processor that may be either part of the logic and control unit or the separate writer computer processor (writer CPU) on the WIF board. The second port of the BIN LUT receives an output of a 12-bit counter 46 that counts pulses from the writer CPU 37. The output of the counter 46 represents a number 1, 2, 3, 4 . . . that identifies a certain LED in the BIN LUT. For example, assume that there are 88 driver chips on the printhead for driving 44 LED chip arrays each having 128 LEDs. The driver chips as may be seen in FIG. 7 are located to both sides of the LED chip arrays and each driver chip is associated with driving one-half of the LEDs in a particular LED chip array. Odd-numbered driver chips #1–43 drive only low odd-numbered LEDs from 1–2815 and even-numbered driver chips 2–44 drive even-numbered LEDs numbered 2–2816. Similarly, odd-numbered driver chips #45–87 drive odd high-numbered LEDs 2817–5631 and even-numbered driver chips 46–88 drive high even-numbered LEDs 2818–5632. Now odd low-numbered LEDs 1–2815 comprise 1408 LEDs which are binned in BIN LUT 60a. Even low-numbered LEDs are binned separately in a BIN LUT forming a part of a similar LUT assemblage 43b and also comprise 1408 LEDs. A similar result is true for the high-numbered LEDs that are binned respectively for odd-numbered LEDs in the BIN LUT of the LUT assemblage 43c and for the even-numbered LEDs in LUT assemblage 43d. Thus, an output of 12-bit counter 46 simultaneously may be output to one address input of each of the BIN LUTs and represents an address of a respective LED stored therein. For example the address 000000000001 represents the address of: LED #1 in the BIN LUT 60a, LED #2 in the BIN LUT of LUT assemblages 43b, LED #2817 in the BIN LUT of LUT assemblage 43c and LED 2818 in the BIN LUT of LUT assemblage 43d.

In response to the 12-bit count address input to each of the BIN LUTs 60a and as will be discussed in more detail below, a 4-bits per pixel gradation level or grey level data signal, a respective 8-bit data output signal is provided representing a bin value number for which that LED has been assigned. The 8-bit data outputs from the different BIN LUTs are not the same, since the respective LEDs assigned to different bins have different brightness characteristics. The 8-bit bin value number output signal is input to one 17-bit wide data address input of a second dual port RAM 62a that forms a part of the LUT assemblage 43a. In addition to the 8-bit bin value number, there is also input a 4-bit signal representing the grey level of the image data (from the merger device) and a 5-bit signal representing 32 different electrophotographic conditions that may be corrected for. The correction table 62a is of 128 kilobytes in size. This table is further divided into 32 sub-tables of 8 kilobytes in size. The table 62a contains correction data for each of the 16 grey levels at each of the 256 brightness bin values at each of the 32 electrophotographic conditions. A second set of correction tables is provided in a second correction LUT 62a' forming a part of LUT assemblage 43a so that the writer CPU processor can load newly calculated correction parameters to one set of correction tables so that the other set is used for printing.

Figure 5:
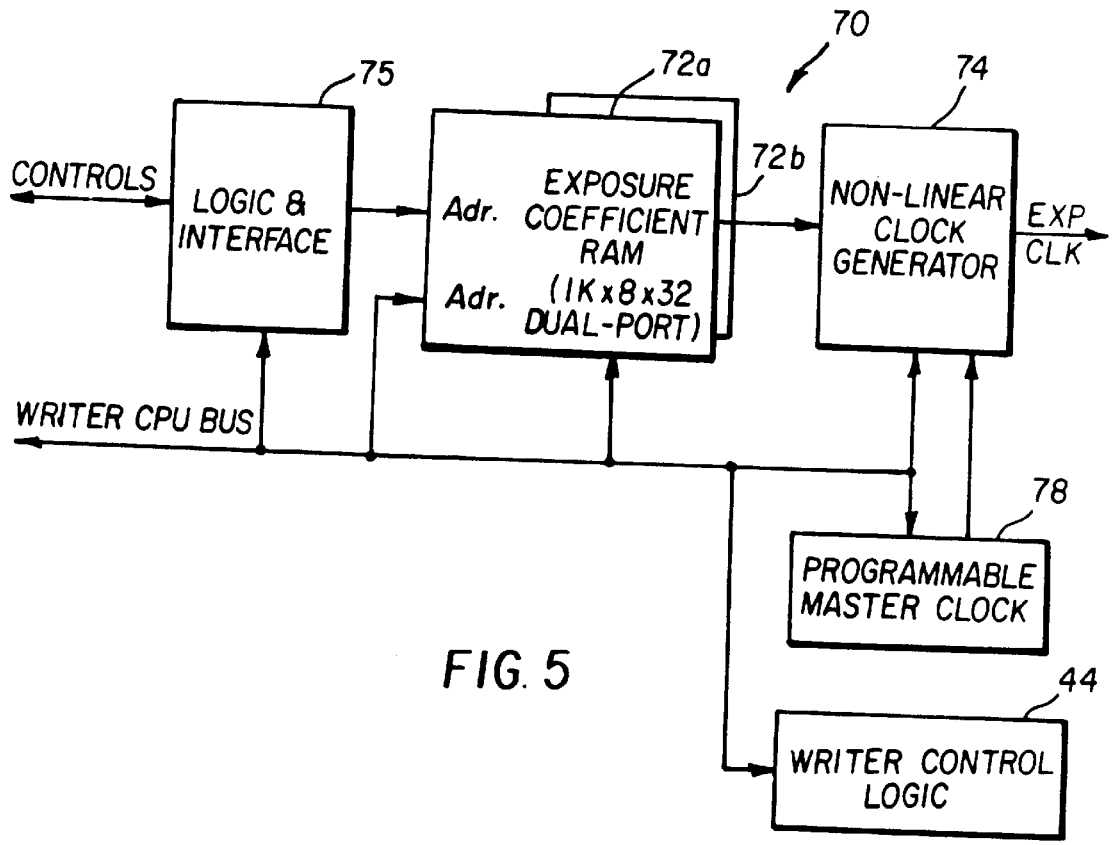
FIG. 5 is a block diagram of a non-linear clock generator forming a part of the apparatus of FIG. 1.

The corrected data stored in the correction LUTs comprises tables of 6-bits/pixel data signals wherein each represents an exposure time for output to the printhead for controlling a recording duration for recording a pixel by an LED. Since four correction tables in the four LUT assemblages 43a–d are under the same clock control, there is output simultaneously to the printhead corrected image data for four LEDs on four-six bit wide image data busses. As noted in U.S. Pat. No. 5,253,934 a token clock signal may be provided to enable an appropriate data latch register 51 on a driver chip 50 to latch the appropriate corrected image data for storage therein. When the corrected data for all the LEDs is output to the printhead and latched thereon, a output latch signal is provided to output the data in the latch registers to the comparators 52 for determining enablement times of the LEDs for recording a main scan line of pixels. The comparators have an input from a down-up counter 53 which is counting exposure clock pulses (EXPCLK) to the counter. Further robustness in design is provided by having the ability to control the nature of the exposure clock. As noted in U.S. Pat. No. 5,253,934, there may be provided a non-linear exposure clock 70 (FIG. 5) as described in U.S. Pat. No. 5,300,960. With a nonlinear exposure clock, exposure clock pulses output by the clock and counted by the down-up counter 53 are not provided uniformly in time during a main scan exposure cycle. Rather the clock pulses are provided with different time spacings so as to expand out the available number of exposure times. As noted in U.S. Pat. No. 5,300,960 the clock pulses with non-uniform spacings may be provided by outputting to a programmable non-linear clock generator 74 a set of clocking data representing a count for generating the next exposure clock pulse. An example of controls for a non-linear clock generator is illustrated in FIG. 5 wherein data for "exposure coefficients" is stored in dual port RAMS 72a, 72b, each of which stores 1024 8-bit size exposure coefficients for each of 32 electrophotographic conditions. A logic and interface device 75, in response to a signal from the writer CPU provides a changing address to one of the dual ported exposure coefficients RAM 72a or 72b which is currently being used and which address during printing identifies a particular one of 32 electrophotographic conditions. The logic and interface and the writer CPU maintain control for each succeeding exposure clock pulse to be generated by identifying an address of a particular 8-bit coefficient or programmed number for output to the programmable non-linear clock generator 74. Upon receiving the 8-bit coefficient, the clock generator 74 commences to count master clock pulses from a programmable high speed (40–60 MHz) master clock generator 78. Upon reaching the programmed count established by the 8-bit coefficient, the non-linear clock generator 74 emits an exposure clock pulse to the printhead and resets whereupon the logic and interface 75 selects a new exposure coefficient from table 62a to be output to clock generator 74 for generating the next exposure pulse. Actually, in order to facilitate better timing, the loading of the next exposure coefficient into the clock generator 74 may be undertaken prior to the clock generator's 74 being reset so that the count of master clock pulses may commence directly after the resetting of the clock generator 74. The logic and interface device is programmed to select addresses of coefficients in a preprogrammed order and the exposure coefficient data at such addresses are so arranged as to provide for the desired or programmed order of exposure clock pulses being sent to the printhead. An alternative approach to generating exposure clock pulses is disclosed in U.S. application Ser. No. 07/807,522, filed in the name of Kelly et al, wherein sets of binary "0"s and "1's" are stored and can be loaded to a shift register so that where say a binary "1" is stored, it may be shifted out as an exposure clock pulse in response to a shift clock signal generated by a high speed master clock.

In order to achieve an even broader range of exposure correction ability, the master clock may be programmable so that it operates at any desired frequency from say 40 to 60 MHz which is adjustable in steps of 200 kHz within this range. However, during any main scan pixel line recording period the master clock 78 is fixed. The use of two dual port RAMs 72a, 72b allows for a so-called "ping-pong" type of activity wherein one may be used during printing of one main scan line of pixels while simultaneously new data is being loaded into the other in the event different environmental conditions within the copier/printer require a new set of 32 tables. After the new coefficient data is being loaded into the coefficients table 72b and/or exposure correction table 72a', printing may commence using these updated tables so that only a minimum time is used to update printing conditions.

Where the printhead is used to record image data for development in two different colors 16 sub-tables in the correction LUT 62a may be used for each of the two color toners. Since printing with different color toners may be needed on adjacent or even the same image frames, it may be desirable to have the data prestored in the LUTs so that switching of correction data for different colors may be done on a mainscan line by line basis. Even though only 16 sub-tables are provided for each color for providing a corrected exposure for each grey level, one can define 8 of these sub-tables to be used for, say, text and a different set for pictures (halftones). The operator may provide through an input on the operator control panel or a terminal or the data may otherwise be coded to cause signals to be generated to the LCU or other control in the copier/printer to allow the copier/printer to distinguish between different image types and select a color for development of the image. Algorithms are well known for distinguishing image types when the data is electronically processed and can determine the characteristic of the data as being pictorial and suited for halftone processing or textual and suited for textual processing. Such a block of data may have a flag or control bit associated with it noting the nature of the image or its processing and this control bit may be sensed by the writer CPU to provide a signal to adjust the correction LUT and the exposure coefficient LUT 72a or 72b to select the appropriate sub-tables for the particular type of image.

Within each of the group of 8 sub-tables to be used for the different image types (text or halftone), one can have say four of these sub-tables assigned with a bit-depth of two bits per pixel and the other four sub-tables assigned a bit depth of four bits/pixel. Note that the grey level image data could be selected by the operator or be determined by the copier/printer to be 1,2 or 4-bits per pixel. For example, in operating as a printer, the printer may be attached to a source of data such as a personal computer terminal that is providing data with a bit-depth of a single bit per pixel. Other sources, be they computer terminals, networks, facsimile devices or a copier wherein a document is scanned, the data may be input and converted to a bit-depth of 2 or 4-bits per pixel. Thus, accommodation is made for each of these to correct for exposure conditions in accordance with the bit-depth of the image. In the case of the image data being of a bit-depth of 1-bit per pixel input, one may use the extreme values of either the 2 bits/pixel sub-tables or the 4 bits/pixel sub-tables, e.g., if the 2 bits/pixel table is used and the 1 bit/pixel image data signal is input, such signal may be adjusted, for example, by logic in the image data merger device or as part of a logic device associated with the WIF board 36 prior to input into the correction LUT as a 2 bits/pixel digital signal that only has values of 0 and 3. Alternatively, where input into the 4 bits/pixel correction LUT 62a, it may be first converted to a 4 bits/pixel signal only having values of 0 and 15. Such conversion may be provided by a relatively simple suitable logic device on the image data merger logic device 34 or as part of a logic device associated with the WIF board 36. As noted in U.S. application Ser. 08/580,263, the reason that one may want to use different tables for bit-depth is because in printing of text images, for lower bits/pixel (like 2-bits), it may be desirable to skew the exposure value relative to the grey value to the higher side than in the case of 4 bits/pixel. For example, with a two bits/pixel grey level image the two bits/pixel are converted by the exposure correction LUT to a six bit/pixel signal for transmission to the printhead. For an LED, having an average brightness characteristic, one might expect to have the exposure range in terms of lightness space divided so that the densest pixels have the maximum exposure or "1" or $\frac{2}{3}$ exposure (assuming a discharge area development system), with the remainder of the exposure spectrum divided $\frac{2}{3}$, $\frac{1}{3}$, 0 or minimum allowed exposure. With skewing of exposures towards creation of denser pixels particularly for text-type images, the lightness spectrum for an achromatic image for example may be divided so that it is now 3/5, 2/3, 1/2, 0. The exposure times as established by the six bits/pixel corrected signals stored in the correction LUTs 62a, 62a' thus can be adjusted to provide this skewing or bias to the creation of denser pixels for tables storing corrected exposures for text type images. For charged area development, the skewing may be in the opposite direction to create the same result. As noted above, each image type of each color is supported by four bit-depth sub-tables. These tables thus establish four exposure vs. grey level curves that are of different slopes and offsets which may be selected by customers for a different need. Of course, some help on tone reproduction curve (TRC) choices is also there in the front-end image processor where image mapping was done before the image data was sent to the WIF board. In conjunction with the corresponding non-linear exposure clock, coefficient RAM 72a (see FIG. 5), programmable master clock 78 and GREF control allow one to cover a large dynamic range of the exposure space.

The second set of correction LUTs 62a' and those forming a art of LUT assemblages 43b–d can be updated based on changes in lectrophotographic conditions that the process control system can sense from measuring the charge on the film web, the developed density of the toner on the film frame, temperature and humidity of the printer as well as customer programmable new desired inputs. Thus, new conditions can be calculated by the processor and input into the table through the alternate address and data inputs even when printing is in progress to select the most desirable tables to use next. It is also true that not all the tables need to be updated to save time. Between jobs or image frame, one can actually ping-pong from the first set of correction LUTs and exposure coefficient RAM tables to the second set. Therefore, high speed, high quality flexible look-forward non-uniformity correction can be accomplished.

Other extensions in this area include using some non-volatile memory like flash memory to store some limited set of LUTs (that may include the last selected table used) instead of storing everything in volatile memory, so for quick power reset situation which does not require a fuser warm-up, the WIF board will be up and running without having to wait for LUT refill. Other extensions may include a different arrangement of LUT usage conditions.

In order to speed up the calculation of the data stored in the correction tables 62a, 62a'0 and reduce the communication time between the printhead and the WIF board it has been found to be advantageous to organize certain data for storage on the printhead so as to resolve this problem. Associated with the printhead 22 is a secondary or printhead interface (PIF) board 82 that includes a nonvolatile flash memory 80 ($E^2$ PROM technology) and supporting circuitry 84 for interfacing the WIF board with the PIF board. The flash memory stores pre-binned data for this printhead that is to be loaded into the BIN LUTs. The pre-binned data is determined during factory calibration of the printhead wherein measurements are made of the light output of each LED in accordance with the following steps set forth in the flowchart of FIG. 8 taken in conjunction with the disclosures of U.S. application Ser. Nos. 08/175,079 and 08/580,263. In calibrating the LED printhead, there is attached to the printhead a lens for focusing light from the LEDs. The lens is preferably a Selfoc lens, trademark Nippon Sheet Glass Co., Ltd.

Figure 8A:
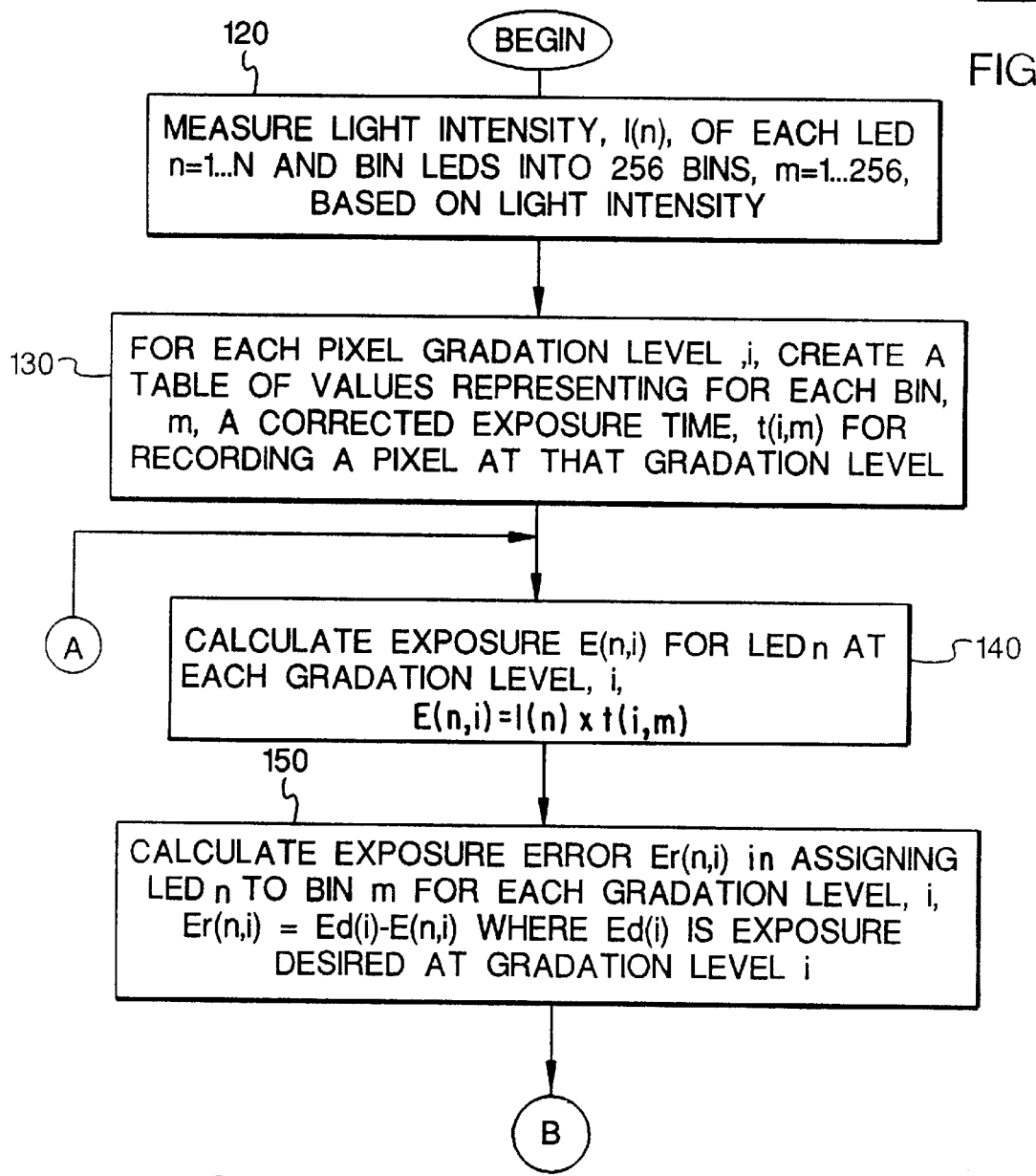
Figure 8B:
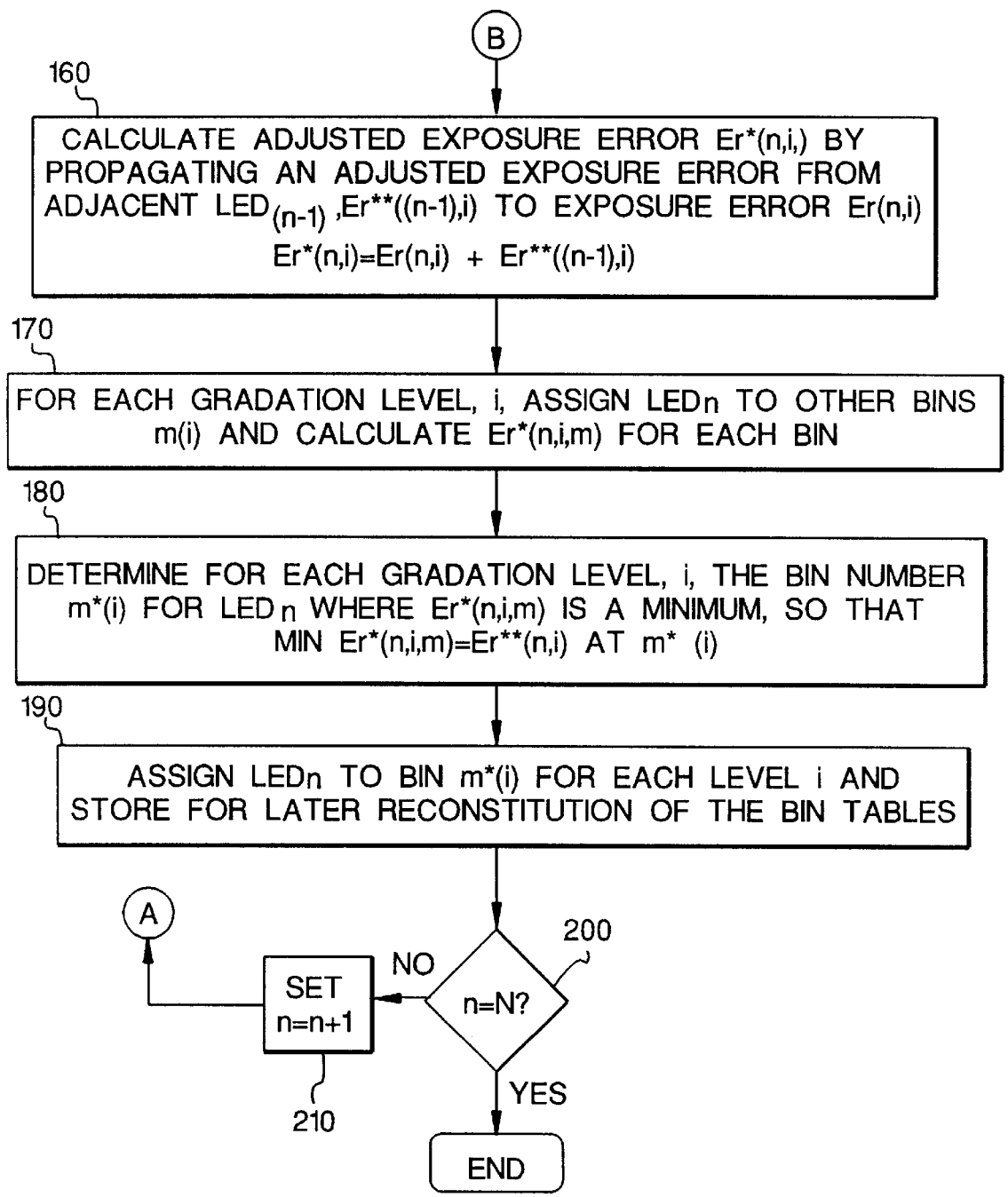

With reference to FIGS. 8, 8A and 8B calibration steps 120 and 130, may occur initially according to the process set forth in U.S. application Ser. No. 08/175,079 and/or 08/580, 263. In step 120, intensity or power output I(n) of light output from each of the LEDs is measured wherein n=1 . . . N, (N=5632 the total number of LEDs on the printhead). Based on the light outputs, the LEDs are binned into one of m=256 bins.

In step 130, for each pixel gradation level, i (i=1 . . . 15 wherein i=$2^j$−1, assume j=4 bits/pixel), a table of values is created for each bin m of a corrected exposure time, t(i,m) for recording a pixel at that gradation level by an LED assigned to that bin. This table of values is for storage in "COR LUT 62a, 62a' as described in the incorporated-by-reference referenced applications.

For each LED, LEDn, at each gradation level i exposure E(n,i) is calculated according to the equation E(n,i)=I(n)×t (i,m), step 140.

In step 150, expected exposure error, Er (n,i), is calculated for each LEDn at each grey level. This exposure error represents the difference between the desired exposure Ed(i) for a pixel at level i and the actual exposure which will occur E(n,i). Er(n,i)=Ed(i)−E(n,i). This error arises because assigning LEDs to bins and thereby associating an exposure time t(i,m) for all LEDs in that bin is an approximation process wherein the fewer the bins, the larger the expected exposure error. In lieu of the actual exposure intensity, I(n), exposure value E(n,i) may be approximated by using the average intensity or power of an LED assigned to a bin.

The exposure error for each LEDn at each grey level is then adjusted in step 160 by propagating an adjusted exposure error calculated from adjacent LED(n−1). Thus, adjusted exposure error Er* (n,i)=Er (n,i)+Er((n−1),i). The exposure error Er((n−1), i) was calculated previously in accordance with this algorithm when considering the previous LED, $LED_{(n-1)}$.

In step 170 for each LEDn, an adjusted exposure error Er*(n,i,m) at each gradation, i, is calculated for the case where LEDn is assumed to be assigned to other bins. That is say LEDn was initially assigned to bin #114. Its adjusted exposure error was calculated in step 160 using an exposure time t(i,m=114). However, if adjusted exposure error for LEDn is calculated by assuming that LEDn was assigned bin #1, then bin #2 . . . bin #113, bin #115 . . . bin #256, then for each grey level and each bin there is a corresponding exposure time t(i,m). To reduce the number of calculations, only bins that are relatively close to target may be used.

In step 180 for each gradation level i, there will be for each LEDn a bin number m*(i) where adjusted error Er* (n,i,m) is a minimum. The bin number m*(i) for LEDn where this minimum occurs is determined and stored. The minimum adjusted Er*(n,i,m) at each m*(i) which is Er** (n,i) is also stored for propagation of adjusted error to pixel n+1.

In step 190, the bin # assignment values for the Bin LUTs are now stored in accordance with the values m* (i) calculated in step 180. Thus, LEDn is now assigned for each gradation level i the bin number m*(i).

In steps 200 and 210, the process of steps 140–190 is repeated for each LED at each grey level or gradation level i until all LEDs are assigned a bin number m*(i).

Note that in the above, the BIN LUT now requires an input of gradation level i since an LED may be assigned different bin numbers for different gradation levels. The exception to this is where the printhead is operated in a binary mode; i.e, the gradation input signal may be 1 bit in dimension and thus a pixel is either on or off. In such a case, correction is still provided for the LEDs in accordance with the teachings herein by modifying the 1 bit/pixel signal to say a 6 bits/pixel exposure time signal output by COR LUT 62a.

The values of mean power, $P_m$, are then calculated for each of the BIN LUTS as newly constituted for each gradation level since the LEDs placed in each bin vary according to gradation level. Histogram, bin assignments and mean power $P_m$ may be calculated for each bin and be downloaded from the computer forming a part of the factory calibration equipment and stored in the flash memory 80 of the printhead's secondary interface board 82, which is a board attached to the LED printhead's support member adjacent one end of the printhead 22. Because this board is attached to the printhead, it is portable therewith so that when the printhead is factory-calibrated, the data associated with such calibration may be loaded onto the flash memory and stored and retained thereon since such memory is non-volatile. Also stored in this flash memory 80 are the printhead's identification number (ID), the number of times the printhead has been factory recalibrated and the GREF and the LREF data values used for determining the level of current in each driver channel during the factory calibration process when the LEDs are enabled and their brightness characteristics measured and stored in the computer associated with the calibration process. As noted above, the LREF values are different from driver chip to driver chip so these are stored as a table set of 8-bit values {LREF$_d$} wherein d=1→88 for the 88 driver chips on this printhead so that the LREF data is identified with the driver chip it is associated with. These LREF values are those used to balance LED array brightness from driver chip to driver chip when the LEDs are energized for the same exposure period.

After factory calibration of the printhead assembly which refers to a calibration when the printhead and its lens are not on the copier/printer, the printhead assembly is mounted on the copier/printer.

After the printhead assembly is mounted on the copier/printer power signals are applied to the printhead. A control signal or a power on-reset signal from writer CPU on the primary WIF board is provided to a conventional memory control chip 84 on the secondary interface board 82 on the printhead. In response to this control signal, the printhead ID is output to the writer CPU and compared with a printhead ID number previously stored in a nonvolatile memory on the WIF board and forming a part of the writer CPU and representing the ID of the printhead last used on this copier/printer apparatus. It is then determined if this is a newly mounted printhead. If this is determined to be a newly mounted printhead, a signal is provided to the secondary interface board to read the additional data that is stored in the printhead's flash memory 80. This data is now read from the flash memory 80 and output on the control bus to the WIF output board 36 for storage in a memory forming a part of writer CPU 37. The CPU then uses this data to reconstitute the BIN LUTs and the COR LUTs.

Thus, in accordance with the method described above, use is made of the correlation of neighborhood LEDs to reduce the residue non-uniformity noise in spatial frequency space via a one-dimensional error diffusion (1-DED) in exposure in the cross-track direction (along the printhead). The LED brightness bin table is modified in the dual LUT non-uniformity correction scheme.

Figure 9:
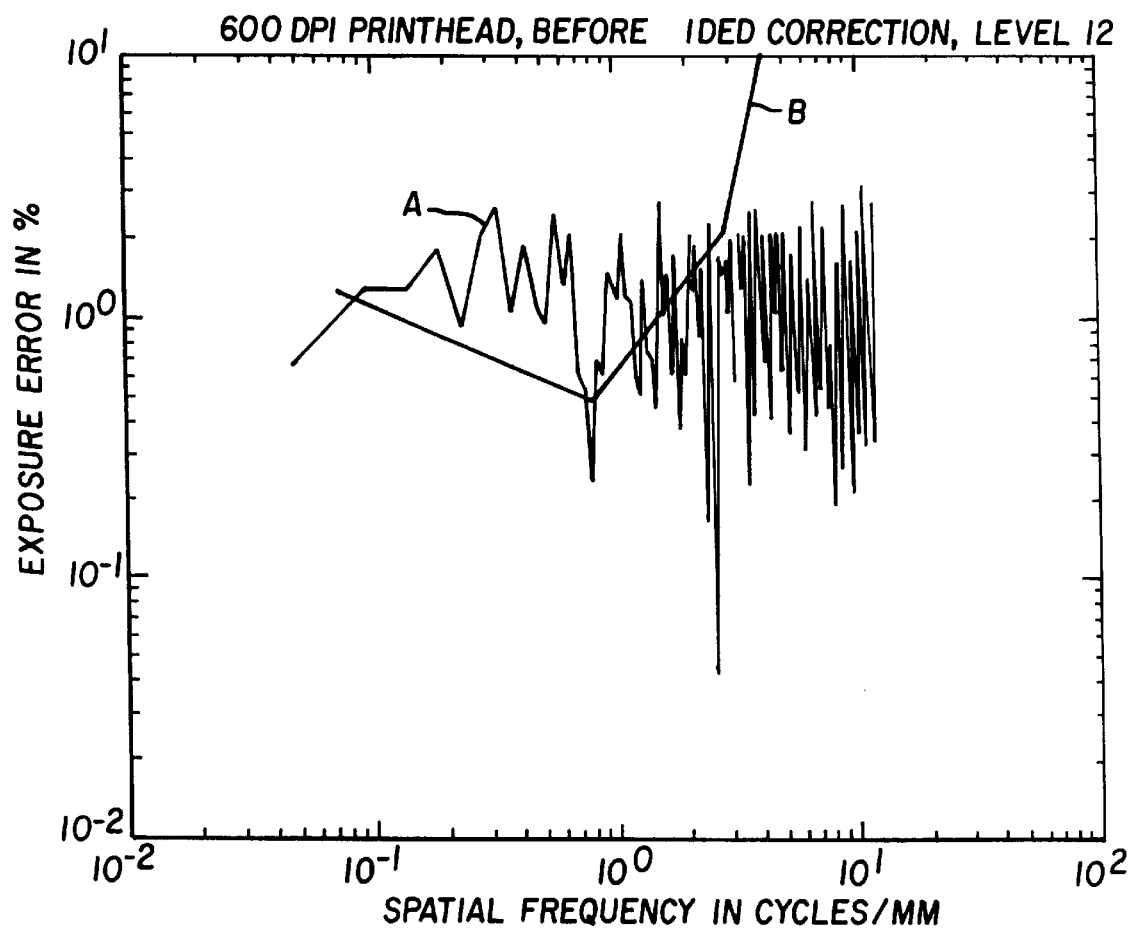
FIG. 9 is a graph illustrating typical exposure error vs. spatial frequency for a printhead relatively well corrected for nonuniformities in accordance with the prior art.
Figure 10:
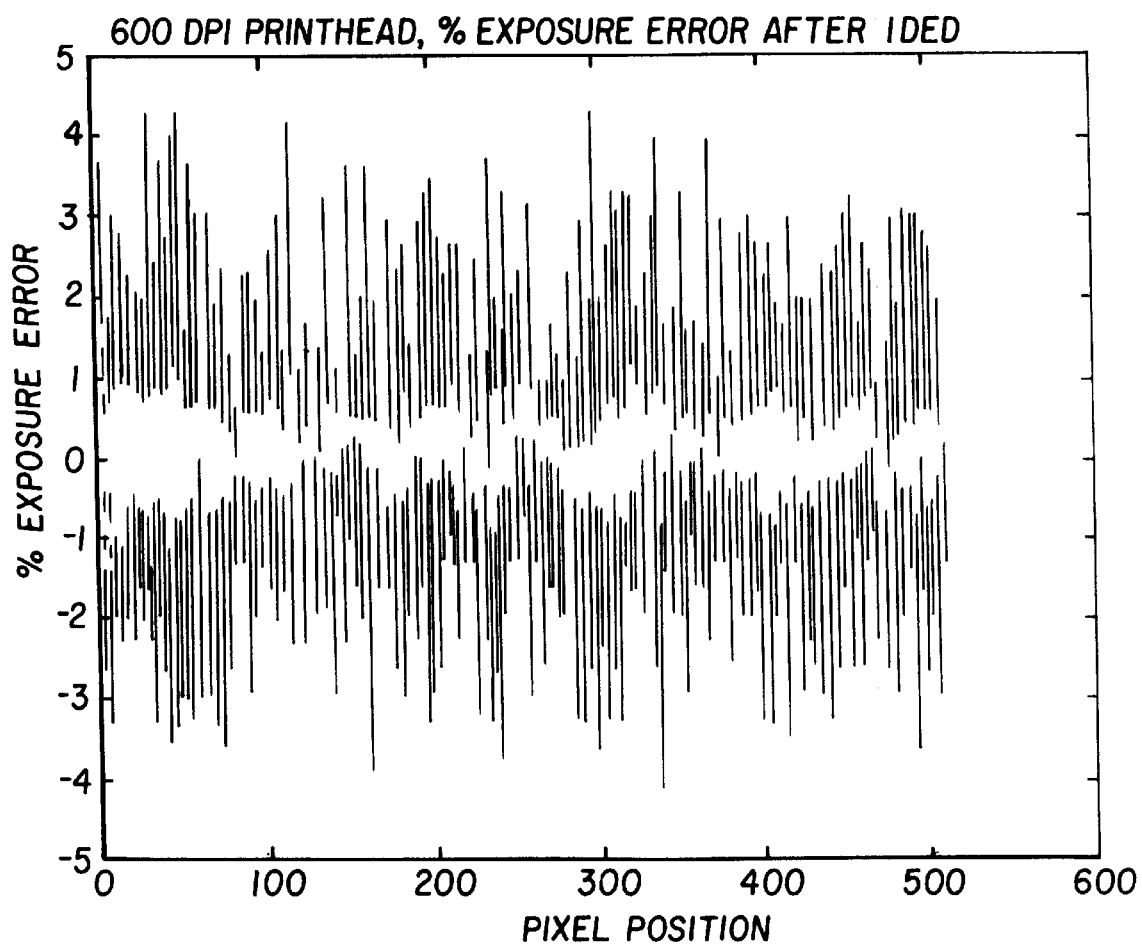
FIG. 10 is a graph illustrating exposure error with reference to pixel position in a printhead corrected for nonuniformities in accordance with the invention.
Figure 11:
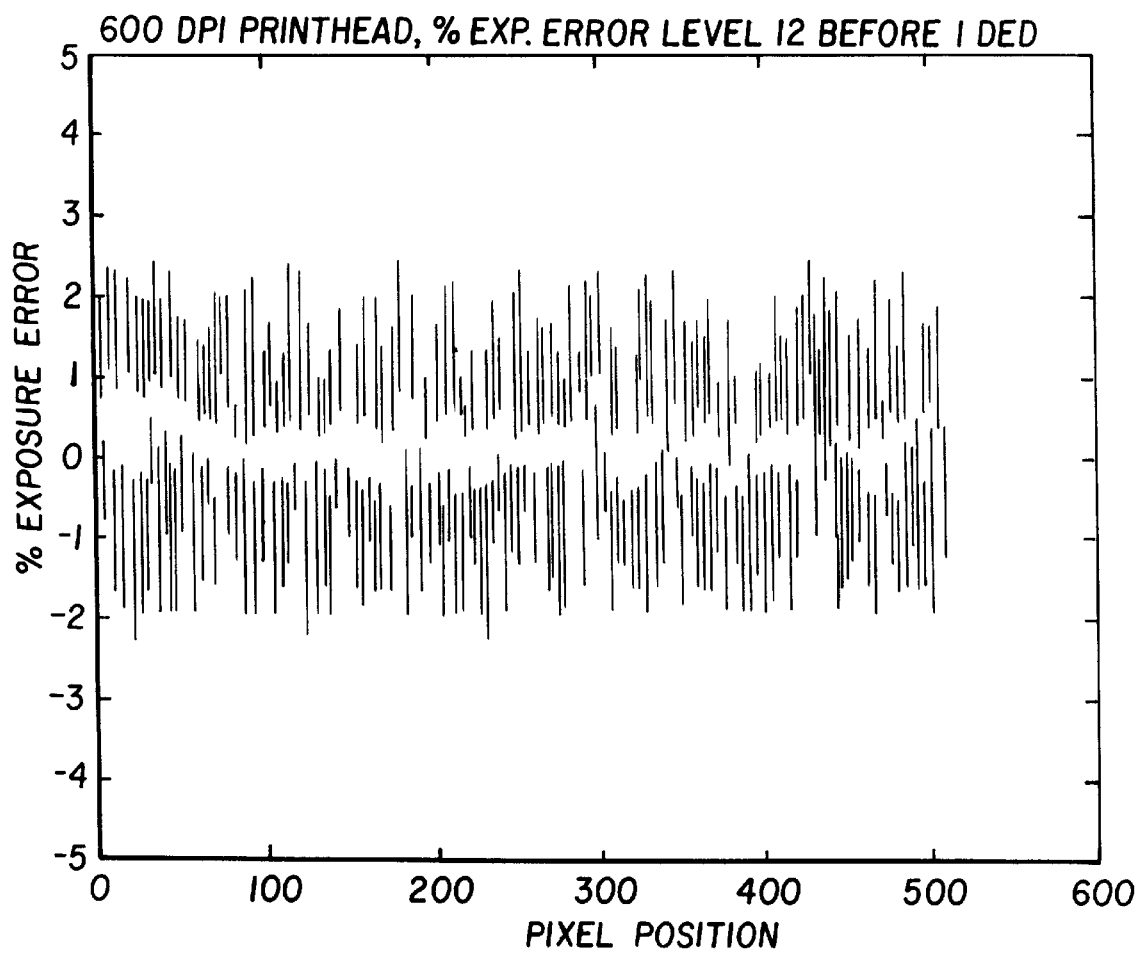
FIG. 11 is a graph illustrating exposure error with reference to pixel position in a printhead corrected for nonuniformities in accordance with the prior art.
Figure 12:
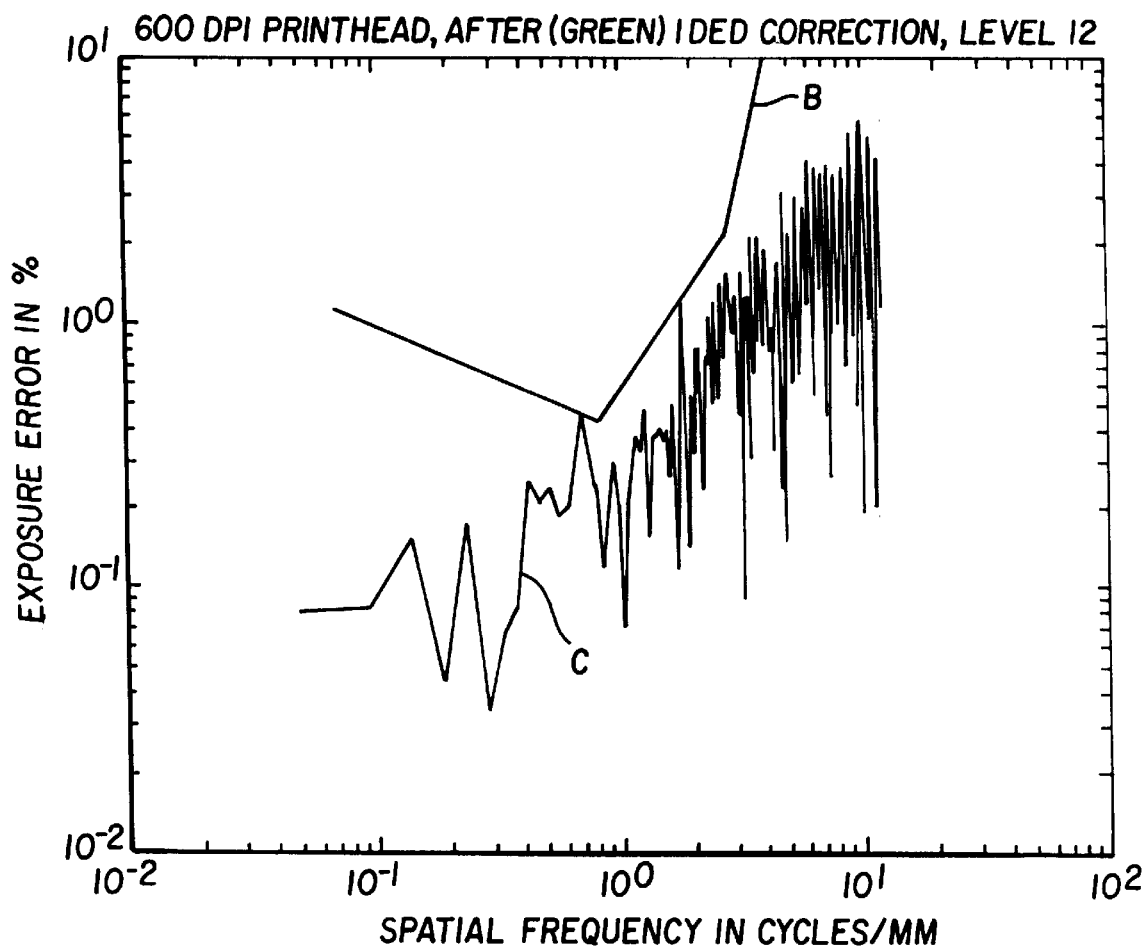
FIG. 12 is a graph illustrating exposure error vs. spatial frequency for a printhead corrected for nonuniformities in accordance with the invention.

Consider an example of gradation level 12 (12 of 15 which is maximum density) as an example using a 600-pi printhead that has its BIN LUT initially calculated based on a per LED basis correction per the prior art with correction and clock LUTs. The BIN LUT associated with gradation level 12 is then modified based on a one-dimensional error diffusion in exposure as described above . As a whole, the peak to peak residue exposure error of individual pixels after 1-DED correction would actually be higher (see FIG. 10) (mean error=0.0052%, stdev error=1.922%, peak to peak error ~+/−4%) compared with the original correction before 1-DED is used (see FIG. 11) (mean error=0.0156%, stdev error=1.352%, peak to peak error ~+/−2.25%). However, the residue exposure error after 1-DED correction shows a significantly lower amplitude at lower spatial frequency (where it is more visible and less tolerable to a human observer) than it shows at the higher spatial frequency as seen in FIG. 12, curve C. If you now compare the residue exposure error for level 12 as a function of spatial frequency curves together for the prior art mode of correction curve A of FIG. 9 and with 1-DED (FIG. 12, curve C) and also include the visual tolerance curve for a 141 lines/inch mixed-mode grey level halftone screen for comparison line B in FIGS. 9 and 12, it is clear that the 1-DED correction mode produces a result that is more tolerant to a human observer. In the case of a binary system with uniformity correction or a system with a multilevel halftone with a predominant exposure level, this change will be sufficient. However, in order to optimize this system for all gradation levels, it is advantageous to change the architecture of the dual LUT so that each of the gradation levels (all 16 in this case) will use its own bin LUT that points to the COR LUT. Thus, instead of just having the pixel location input into the bin table, there is also input the gradation level into the bin table as well.

Although the above description is with respect to a copier/printer having an LED printhead, the invention is also applicable to copier/printers that include two or more printheads. The invention is also useful in copier/printers wherein two or more color images are formed on the photoconductor in one image frame or on separate image frames and then combined on an intermediate member or on an ultimate receiver sheet such as plain paper. The invention is very suitable for correcting non-uniformities on LED printheads having Selfoc lenses which lenses may introduce low frequency visual artifacts and these artifacts may be removed by the use of the invention.

Although the invention has been described with reference to LED printheads, the invention is applicable to other types of printheads having plural elements that require correction and is not limited to electrophotography but will find utility in other printing technologies. For example, the printhead may be used to expose film or the recording elements may be lasers or other electro-optical magneto-optic, liquid crystal, deformable mirror devices, thermal recording elements, electrographic recording elements, etc. While the drawings illustrate the correction LUTs as separate memories, they may be combined as one large memory. In addition, data for providing corrected exposure parameters may be generated on the fly by high speed computer circuits or dedicated calculating devices.

The invention has been described in detail with particular reference to preferred embodiments thereof, but it will be understood that variations and modifications can be effected within the spirit and scope of the invention.

I claim:

1. A non-impact printer apparatus comprising:
   a printhead including a plurality of recording elements and drivers for driving respective recording elements in response to data relative to respective corrected exposure times for recording respective pixels;
   a first data storage device storing data relative to associating sets of respective recording elements with respective bins;

a signal generator for generating respective first signals identifying respective recording elements;

the first data storage device being responsive to the first signals and to an input relative to gradation levels of respective pixels to be recorded and adapted to output second signals relative to respective bin assignment numbers for respective recording elements wherein bin assignment numbers for each of at least some recording elements are different for different gradation levels;

a second data storage device responsive to the second signals and to an input relative to gradation levels of respective pixels to be recorded for outputting data relative to corrected exposure times for recording respective pixels by respective recording elements;

the first data storage device including data relative to bin assignments of recording elements wherein bin assignment number determination for each of substantially all the recording elements is established by propagating exposure error calculated from an adjacent recording element.

2. A method of controlling recording of pixels with a non-impact recording printhead having a plurality of recording elements, the method comprising the steps of:

inputting into a first data storage device a first signal relative to identifying a specific recording element and a second signal identifying a gradation level for recording a pixel by the recording element;

in response to the first and second signals outputting from the first data storage device a third signal identifying a bin assignment number for the recording element;

inputting the second signal and the third signal into a second storage device; and in response to the second signal and the third signal outputting from the second storage device a corrected exposure related parameter for controlling a recording of the pixel by the recording element; and wherein the first data storage device stores bin values associated with respective recording elements and the bin values are determined by one dimensional error diffusion in exposure wherein exposure error from an adjacent recording element is used to determine a bin value of each of substantially all the recording elements.

3. The method of claim 2 wherein the exposure related parameter is exposure time.

4. The method of claim 2 and including the step of calculating mean power for each bin and storing the mean power for each bin on the printhead.

5. The method of claim 2 wherein a bin value of a recording element at a predetermined gradation level is determined by calculating an adjusted exposure error for the recording element by first calculating an exposure error for the recording element without considering an exposure error contribution from an adjacent recording element and then adding to the exposure error for the recording element an adjusted exposure error determined for the adjacent recording element, and then determining for the recording element a bin value at a gradation level that will produce a minimum adjusted exposure error for the recording element.

* * * * *